United States Patent
Murakami et al.

(10) Patent No.: US 7,190,554 B2
(45) Date of Patent: Mar. 13, 2007

(54) MAGNETIC HEAD SUSPENSION

(75) Inventors: Kenji Murakami, Kyoto (JP); Nobuo Suzuki, Kyoto (JP)

(73) Assignee: Suncall Corporation, Kyoto-fu (JP)

( * ) Notice: Subject to any disclaimer, the term of this patent is extended or adjusted under 35 U.S.C. 154(b) by 558 days.

(21) Appl. No.: 10/762,491

(22) Filed: Jan. 23, 2004

(65) Prior Publication Data

US 2004/0150918 A1 Aug. 5, 2004

(30) Foreign Application Priority Data

Jan. 27, 2003 (JP) ............................. 2003-017350

(51) Int. Cl.
G11B 5/48 (2006.01)
(52) U.S. Cl. ................................. 360/244.5
(58) Field of Classification Search ............ 360/244.5, 360/244.2, 245.8, 244.6, 244.7, 264.2
See application file for complete search history.

(56) References Cited

U.S. PATENT DOCUMENTS

| 3,931,641 | A |   | 1/1976  | Watrous |            |
|-----------|---|---|---------|---------|------------|
| 4,167,765 | A |   | 9/1979  | Watrous |            |
| 5,936,805 | A | * | 8/1999  | Imaino  | 360/294.5  |
| 6,172,852 | B1| * | 1/2001  | Boutaghou et al. | 360/244.5 |
| 6,462,910 | B1| * | 10/2002 | Shimizu et al. | 360/244.8 |
| 6,731,472 | B2| * | 5/2004  | Okamoto et al. | 360/294.3 |
| 6,850,392 | B1| * | 2/2005  | Wong et al. | 360/244.5 |
| 6,865,058 | B2| * | 3/2005  | Kube et al. | 360/244.5 |
| 6,870,708 | B1| * | 3/2005  | Fossum et al. | 360/244.5 |
| 6,989,968 | B2| * | 1/2006  | Takasugi et al. | 360/244.2 |
| 2004/0095681 | A1 |   | 5/2004  | Takasugi et al. |    |
| 2004/0145829 | A1 |   | 7/2004  | Fujimoto |    |
| 2005/0128645 | A1 | * | 6/2005  | Limmer et al. | 360/244.5 |
| 2005/0201014 | A1 |   | 9/2005  | Fujimoto et al. |    |
| 2005/0237670 | A1 |   | 10/2005 | Fujimoto et al. |    |

FOREIGN PATENT DOCUMENTS

JP    58-22827    5/1983

* cited by examiner

*Primary Examiner*—Allen Cao
(74) *Attorney, Agent, or Firm*—Sterne, Kessler, Goldstein & Fox P.L.L.C.

(57) ABSTRACT

A magnetic head suspension of the present invention includes a flexure, a load-bent portion, a load beam and a base portion. The base portion has a main body and an embedded body embedded in the main body so as to be positioned in a region where the main body and the load-bent portion overlap with each other. The main body is made of a material having a specific gravity lower than that of the embedded body. The embedded body is made of a material which can be welded to the load-bent portion. The load-bent portion and the embedded body are welded to each other to thereby join the load-bent portion and the base portion to each other.

15 Claims, 6 Drawing Sheets

MAGNETIC HEAD SUSPENSION

BACKGROUND OF THE INVENTION

1. Field of the Invention

The present invention relates to a suspension for supporting a magnetic head used in a hard disk drive.

2. Discussion of the Background

There are demands on a magnetic head suspension for improved controllability so as to move a magnetic head in a seek direction at high speed and accurately position it on a target track, for improved impact resistance, and for reduced power consumption.

To meet these demands, the mass of the magnetic head suspension needs to be reduced while maintaining the rigidity.

Conventionally, it has been proposed that a central region of a stainless steel plate-shaped member forming a load beam is punched out so as to form a hollow shape and that external edges of the hollow stainless steel plate-shaped member are bent to form a flange to thereby reduce the mass while maintaining the rigidity, for example, as disclosed in Japanese Examined Patent Publication No. 58-22827 (1983) (cited reference 1) and U.S. Pat. No. 3,931,641 (cited reference 2).

However, in the magnetic head suspensions described in those cited references, attention is focused only on reduction in the mass of the member forming the load beam and reduction in the mass of the whole magnetic head suspension is not taken into consideration.

Furthermore, a complicated structure is employed, in which the flange makes up for the rigidity reduction due to the hollow structure of the load beam.

SUMMARY OF THE INVENTION

The present invention is made in light of the above conventional technical problems. It is an object of the present invention to provide a magnetic head suspension, a weight of which can be reduced sufficiently while maintaining the rigidity.

To achieve the above object, according to one aspect of the present invention, there is provided a magnetic head suspension including a flexure for supporting a magnetic head, a load-bent portion for generating a load for pressing the magnetic head to a magnetic disk, a load beam for transmitting the load generated by the load-bent portion to the flexure, and a base portion joined to the load-bent portion.

In the magnetic head suspension, the base portion has a main body and an embedded body embedded in the main body so as to be positioned in a region in which the main body and the load-bent portion overlap with each other. The main body is made of a material having a specific gravity lower than that of the embedded body. The embedded body is made of a material which can be welded to the load-bent portion. The load-bent portion and the embedded body are welded to each other to thereby join the load-bent portion and the base portion to each other.

According to the one aspect of the present invention, it is possible to effectively reduce the mass of the whole magnetic head suspension without reducing the rigidity.

Therefore, it is possible to reduce inertia and to improve a vibration characteristic and impact resistance.

Preferably, the main body is made of any one of aluminum, an aluminum alloy, magnesium and a magnesium alloy.

On the other hand, the embedded body is made of any one of nickel, a nickel alloy, stainless steel, a stainless alloy, titanium and a titanium alloy.

More preferably, the embedded body is made of the same material as that of the load-bent portion.

To achieve the above object, according to another aspect of the present invention, there is also provided a magnetic head suspension including a flexure for supporting a magnetic head, a load-bent portion for generating a load for pressing the magnetic head to a magnetic disk, a load beam for transmitting the load generated by the load-bent portion to the flexure, and a base portion joined to the load-bent portion.

In the magnetic head suspension, the load-bent portion and the load beam are formed by a laminated member. The laminated member has a flexible member extending in a longitudinal direction and a low-specific-gravity member which is laminated on the flexible member so as to be positioned at least on a side in contact with the base portion and which is made of a material capable of being welded to the base portion and having a specific gravity lower than that of the flexible member. In a region of the laminated member in which the load-bent portion is to be formed, only the flexible member exists.

Preferably, the laminated member is formed by laminating the low-specific-gravity members on both sides of the flexible member in such a manner as to sandwich the flexible member.

Preferably, the base portion is made of the same material as that of the low-specific-gravity member.

According to one embodiment of the another aspect of the present invention, the laminated member is formed by laminating the flexible member and the low-specific-gravity member by pressing, and then the low-specific-gravity member is removed by etching only in a region of the laminated member in which the load-bent portion is to be formed.

For example, the flexible member is made of any one of stainless, a titanium alloy or a copper alloy, and the low-specific gravity member is made of any one of aluminum or an aluminum alloy.

The base portion may be an arm capable of being attached to a bearing of a voice coil motor or may be attached to an E block by caulking.

BRIEF DESCRIPTION OF THE DRAWINGS

The above, and other objects, features and advantages of the present invention will become apparent from the detailed description thereof in conjunction with the accompanying drawings wherein.

FIG. 3(a) to 3(g) are flow diagrams illustrating an example of a method of producing the magnetic head suspension illustrated in FIGS. 1(a) and 1(b).

FIGS. 6(a) to 6(d) are flow diagrams illustrating an example of a method of producing the magnetic head suspension illustrated in FIG. 4.

DETAILED DESCRIPTION OF THE PREFERRED EMBODIMENTS

Embodiment 1

A first embodiment of a magnetic head suspension according to the present invention will be hereinafter described with reference to the accompanying drawings.

FIG. 1(a) is a top view of the magnetic head suspension 1 according to this embodiment, as viewed from the opposite side to a disk surface, and FIG. 1(b) is a bottom view of the magnetic head suspension 1, as viewed from a disk surface side.

As illustrated in FIGS. 1(a) and 1(b), the magnetic head suspension 1 according to this embodiment includes a flexure 10 for supporting a magnetic head 100, a load-bent portion 30 for generating a load for pressing the magnetic head 100 to a magnetic disk, a load beam 20 for transmitting the load generated by the load-bent portion 30 to the flexure 10, and a base portion 40 connected to the load-bent portion 30.

The flexure 10 has on a distal end side thereof a magnetic head mounting region 11.

The flexure 10 is made of nickel, a nickel alloy, titanium, a titanium alloy, stainless steel or the like. The flexure has a thickness of 15 to 25 μm, for example.

The load-bent portion 30 functions as a blade spring for pressing the magnetic head slider 100 to the magnetic disk against the pressure of an air film generated between the magnetic head slider 100 and the surface of the magnetic disk following rotation of the magnetic disk, thereby to generate the magnetic head pressing load for securing a constant floatation quantity of the magnetic head slider 100.

The load-bent portion 30 is made of nickel, a nickel alloy, titanium, a titanium alloy, stainless steel or the like. The load-bent portion 30 has a thickness of 25 to 60 μm, for example.

Figure 1:
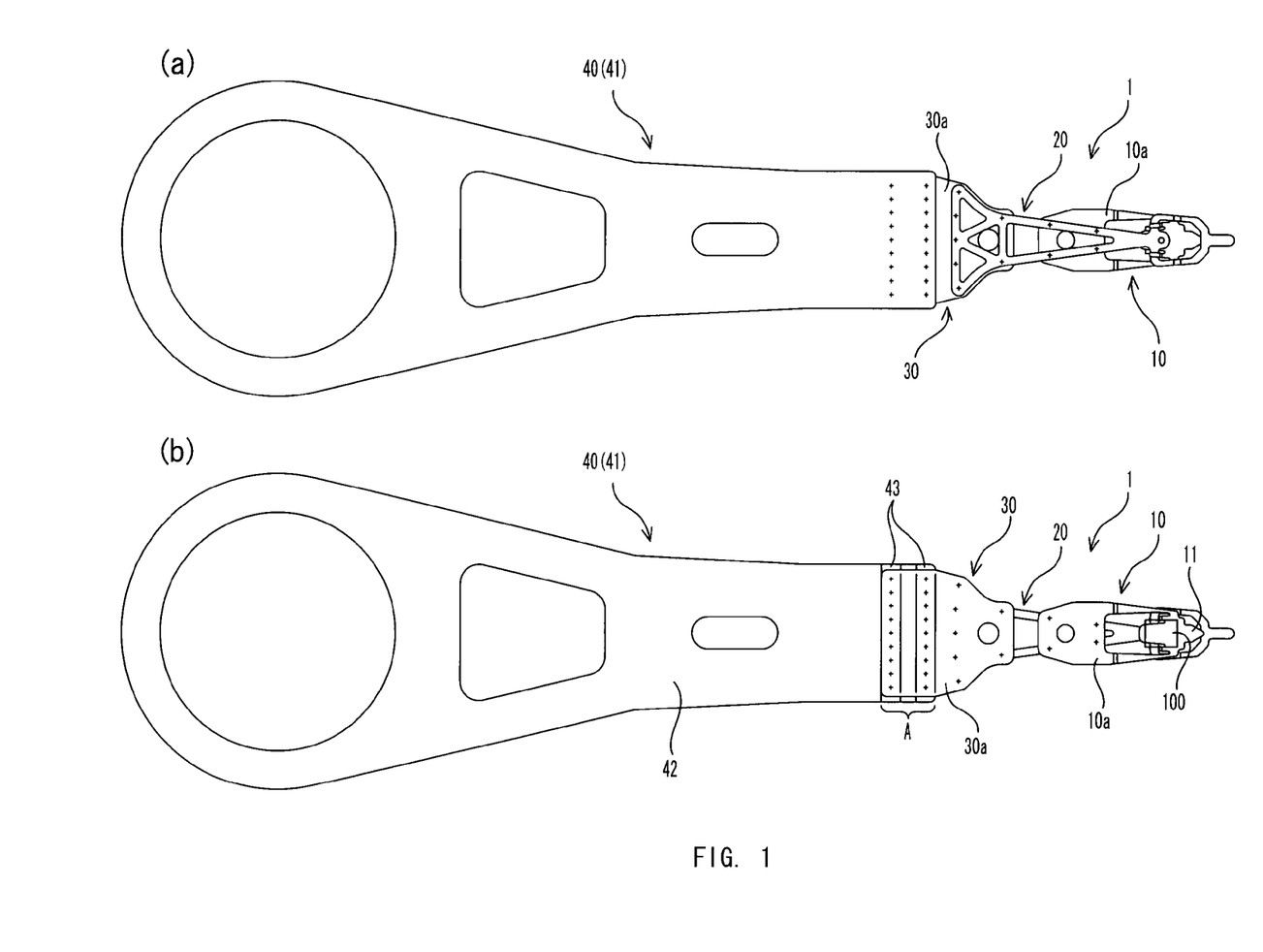
FIG. 1(a) is a top view of a magnetic head suspension according to a first embodiment of the present invention, as viewed from the opposite side to a disk surface.
FIG. 1(b) is a bottom view of the magnetic head suspension illustrated in FIG. 1(a), as viewed from a disk surface side.

In this embodiment, a member for forming the load-bent portion 30 (hereinafter, referred to as a load bent forming member 30a) and a member for forming the flexure 10 (hereinafter, referred to as a flexure forming member 10a) are separated as illustrated in FIG. 1; however, these portions may also be formed integrally.

The load beam 20 transmits the magnetic head pressing load generated by the load-bent portion 30 to the flexure 10 and, also, moves the magnetic head slider 100 in a seek direction to position it on a target track.

As described above, since the flexure forming member 10a and the load bent forming member 30a are separated in this embodiment, the load beam 20 is made of a material which can be welded to both the flexure forming member 10a and the load bent forming member 30a.

Specifically, the load beam 20 is made of nickel, a nickel alloy, titanium, a titanium alloy, stainless steel or the like. The load beam 20 has a thickness of 25 to 150 μm, for example.

The base portion 40 is structured to be able to support an assembly consisting of the flexure 10, the load beam 20 and the load-bent portion 30 and to transmit driving force from an actuator to the assembly.

Specifically, the base portion 40 is joined by welding to the load bent forming member 30a in a region where the base portion 40 overlaps with the load bent forming member 30a.

An arm 41 which can be directly attached to a bearing of a voice coil motor is used as the base portion 40 in this embodiment; however, it is also possible to employ a mount which can be attached by caulking to an E block instead of the arm 41.

Figure 2:
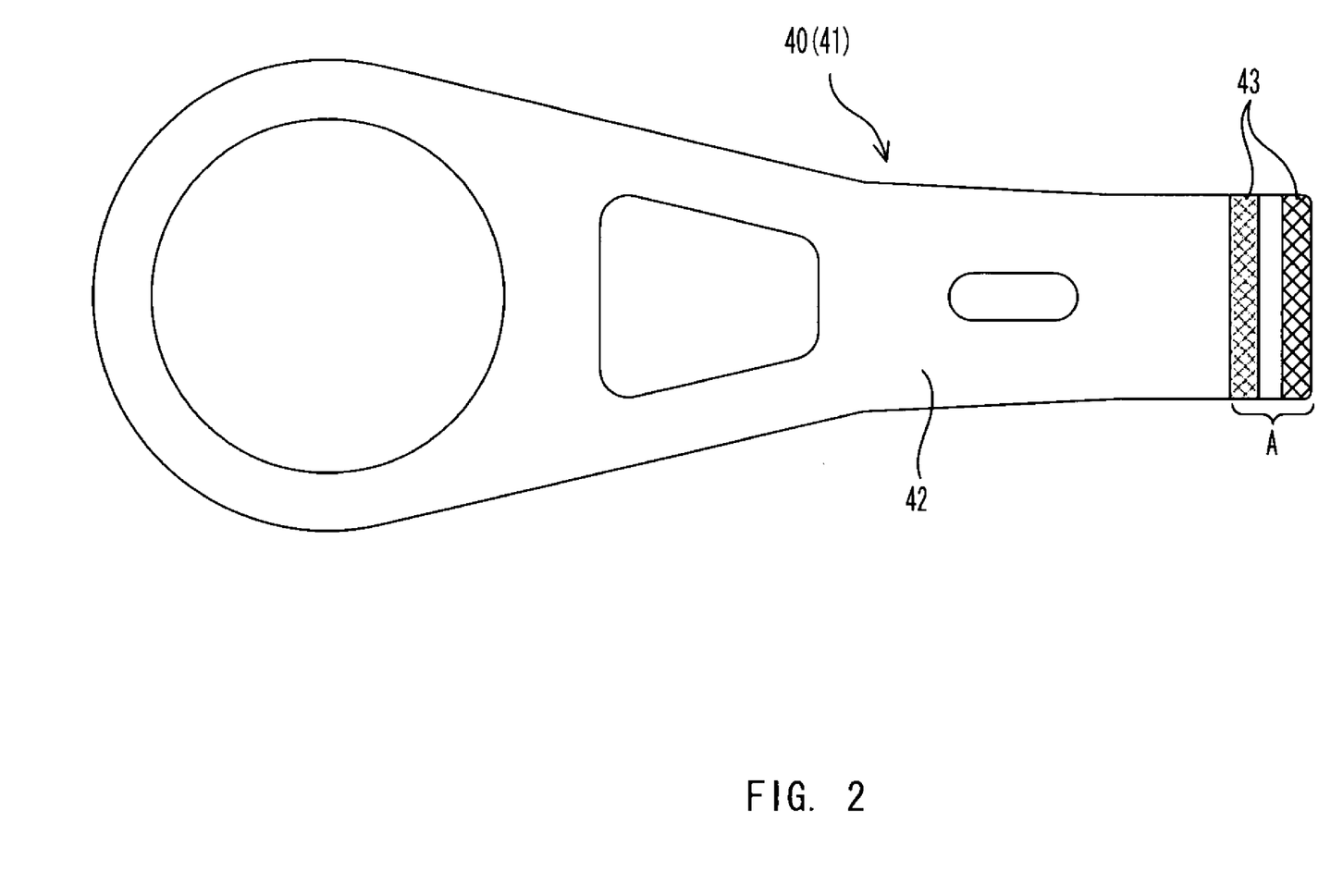
FIG. 2 is a bottom view of an arm in the magnetic head suspension illustrated in FIGS. 1(a) and 1(b), as viewed from the disk surface side.

FIG. 2 illustrates a bottom view of the arm 41 as viewed from the disk surface side.

As illustrated in FIG. 2, the arm 41 has a main body 42 and embedded bodies 43 embedded in the main body 42 so as to be positioned in the region where the arm 41 and the load bent forming member 30a overlap with each other.

The main body 42 has rigidity for performing a function as the base portion and is made of a material having a specific gravity lower than that of the embedded bodies 43.

Specifically, the main body 42 is made of aluminum, an aluminum alloy, magnesium, a magnesium alloy or the like.

The embedded bodies 43 are embedded in the main body 42 in the overlapping region A of the arm 41 and the load bent forming member 30a so as to be in contact with the load bent forming member 30a.

The embedded bodies 43 are made of a material which can be welded to the load bent forming member 30a.

Specifically, the embedded bodies 43 are made of nickel, a nickel alloy, stainless steel, a stainless alloy, titanium, a titanium alloy or the like.

Herein, an example of a method of producing the magnetic head suspension 1 according to this embodiment will be described.

FIGS. 3(a) to 3(g) illustrate flow diagrams of the producing method.

As illustrated in FIG. 3(b), a main body forming plate 42a and an embedded body forming plate 43a are joined to each other by rolling.

For example, the main body forming plate 42a has a thickness of 0.3 to 0.5 mm and the embedded body forming plate 43a has a thickness of 0.03 to 0.1 mm.

At this time, it is preferable that recessed portions 45 may be provided in predetermined positions in the main body forming plate 42a in which the embedded bodies 43 are to be embedded as illustrated in FIG. 3(a).

It is more preferable that materials of about the same hardness are selected from the predetermined materials as materials of the main body forming plate 42a and the embedded body forming plate 43a.

By selecting the materials of the main body forming plate 42a and the embedded body forming plate 43a in this manner, they can easily be joined to each other by rolling.

Next, as illustrated in FIGS. 3(c) and 3(d), a plate-shaped member 41a formed by embedding the embedded body forming plate 43a in the main body forming plate 42a is shaped into a predetermined shape of the arm 41.

Thus, the arm 41 in which the embedded bodies 43 are embedded in the main body 42 is formed.

This shaping process can be performed by presswork, for example.

Then, as illustrated in FIG. 3(e), by welding the embedded bodies 43 of the arm 41 and the load bent forming member 30a to each other, the arm 41 and the load bent forming member 30a are joined to each other.

Such welding can be carried out by laser welding, ultrasonic welding and resistance welding, for example.

Figure 3:
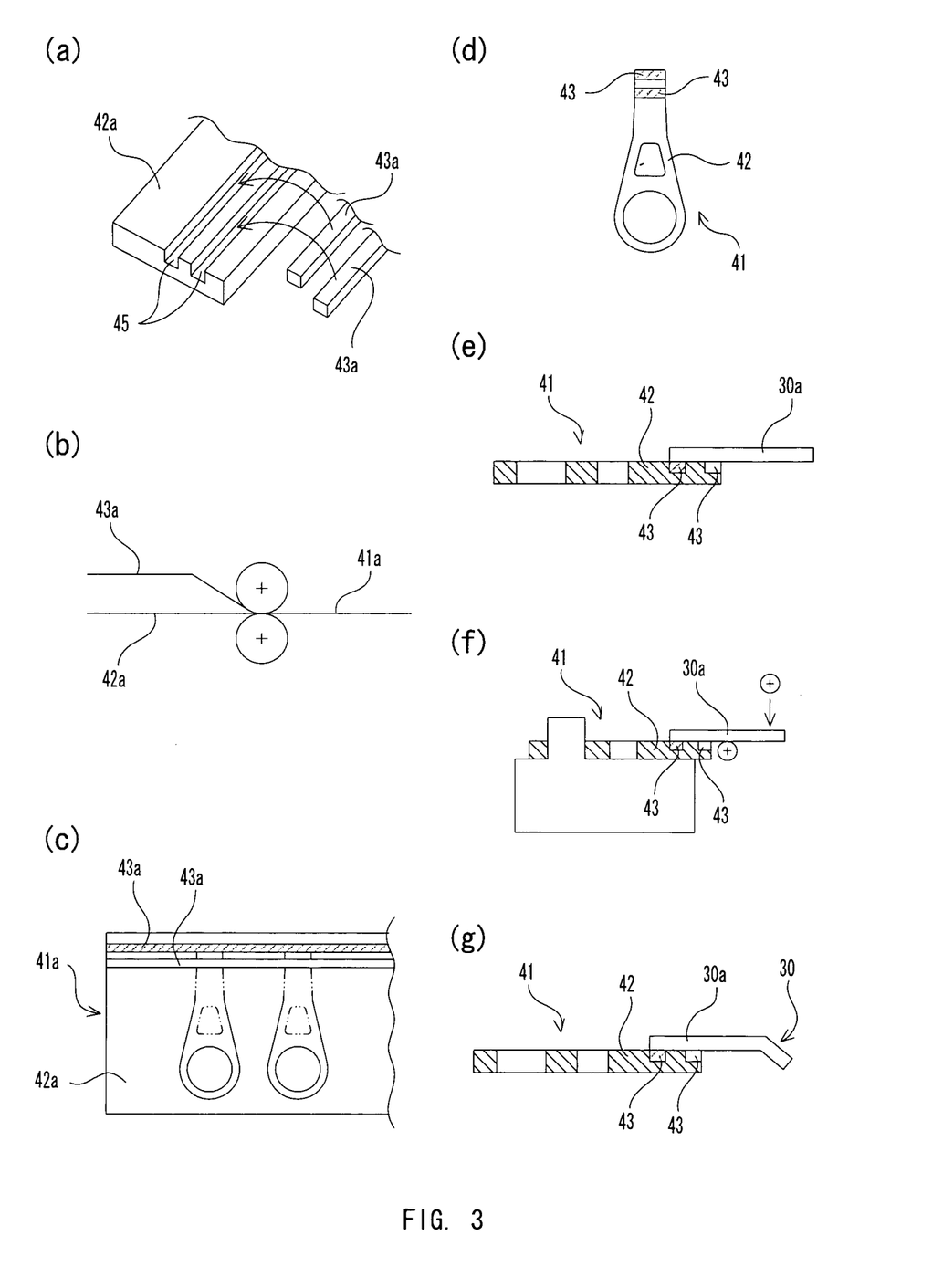

Then, by subjecting the load bent forming member 30*a* joined to the arm 41 to bending, the load-bent portion 30 is formed (FIGS. 3(*f*) and 3(*g*)).

The magnetic head suspension 1 with this structure has the following effects.

Since the base portion 40 has the main body 42 made of the material having the low specific gravity and the embedded bodies 43 embedded in the main body 42 and made of the material which can be welded to the load bent forming member 30*a*, it is possible to considerably reduce the mass of the base portion 40.

Therefore, it is possible to reduce the mass of the magnetic head suspension itself without reducing the rigidity.

Embodiment 2

A second embodiment of a magnetic head suspension according to the present invention will be hereinafter described with reference to the accompanying drawings.

Figure 4:
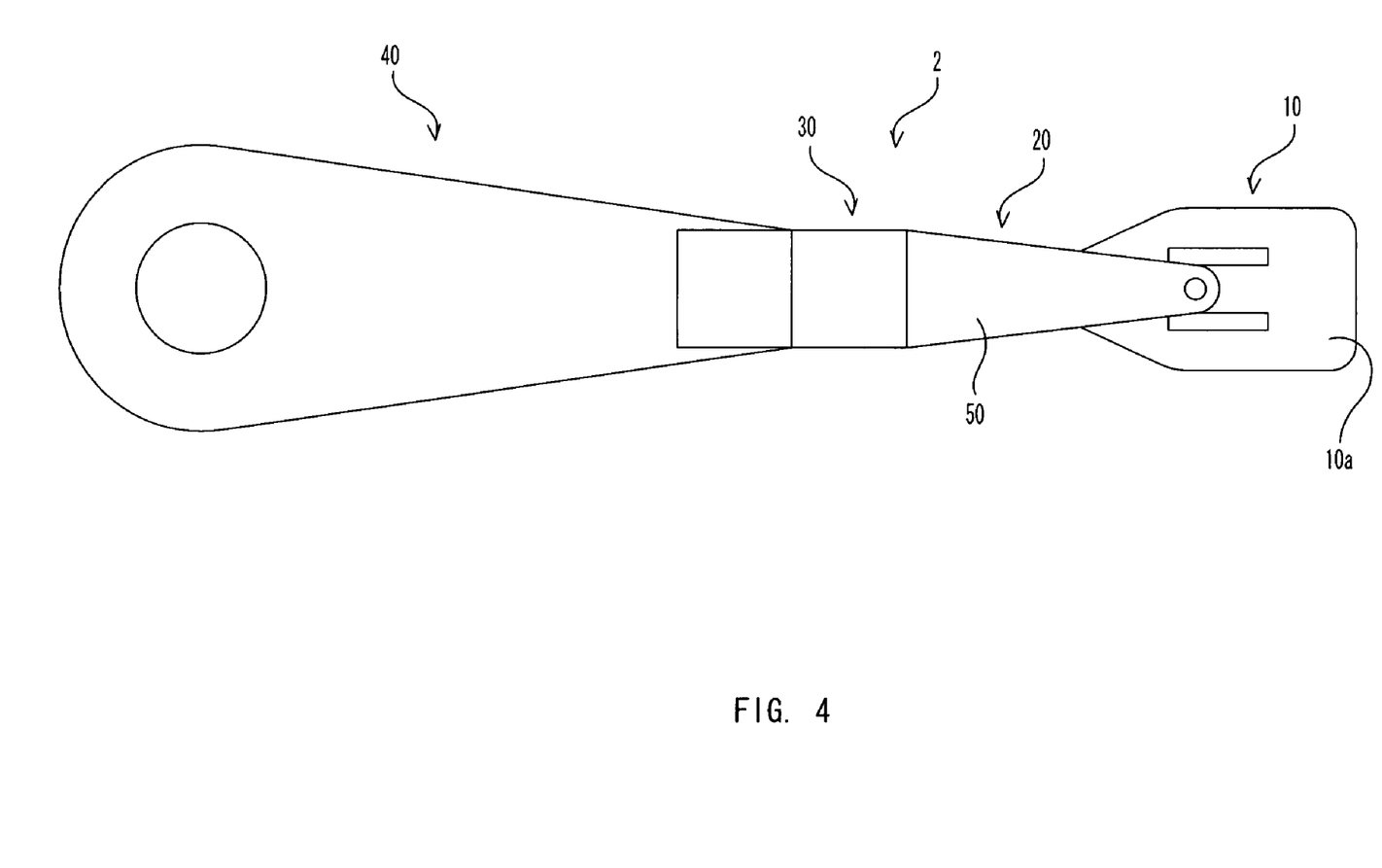
FIG. 4 is a schematic bottom view of a magnetic head suspension according to a second embodiment of the present invention, as viewed from the disk surface side.

FIG. 4 is a schematic bottom view of the magnetic head suspension 2 according to this embodiment, as viewed from a disk surface side.

In this embodiment, corresponding or identical parts to those of the first embodiment have been given the same reference characters.

The magnetic head suspension 2 according to this embodiment also includes a flexure 10, a load-bent portion 30, a load beam 20 and a base portion 40 as in the first embodiment.

In the magnetic head suspension 2 according to this embodiment, the load-bent portion 30 and the load beam 20 are formed integrally.

In other words, the magnetic head suspension 2 includes a laminated member 50 forming the load-bent portion 30 and the load beam 20.

Figure 5:
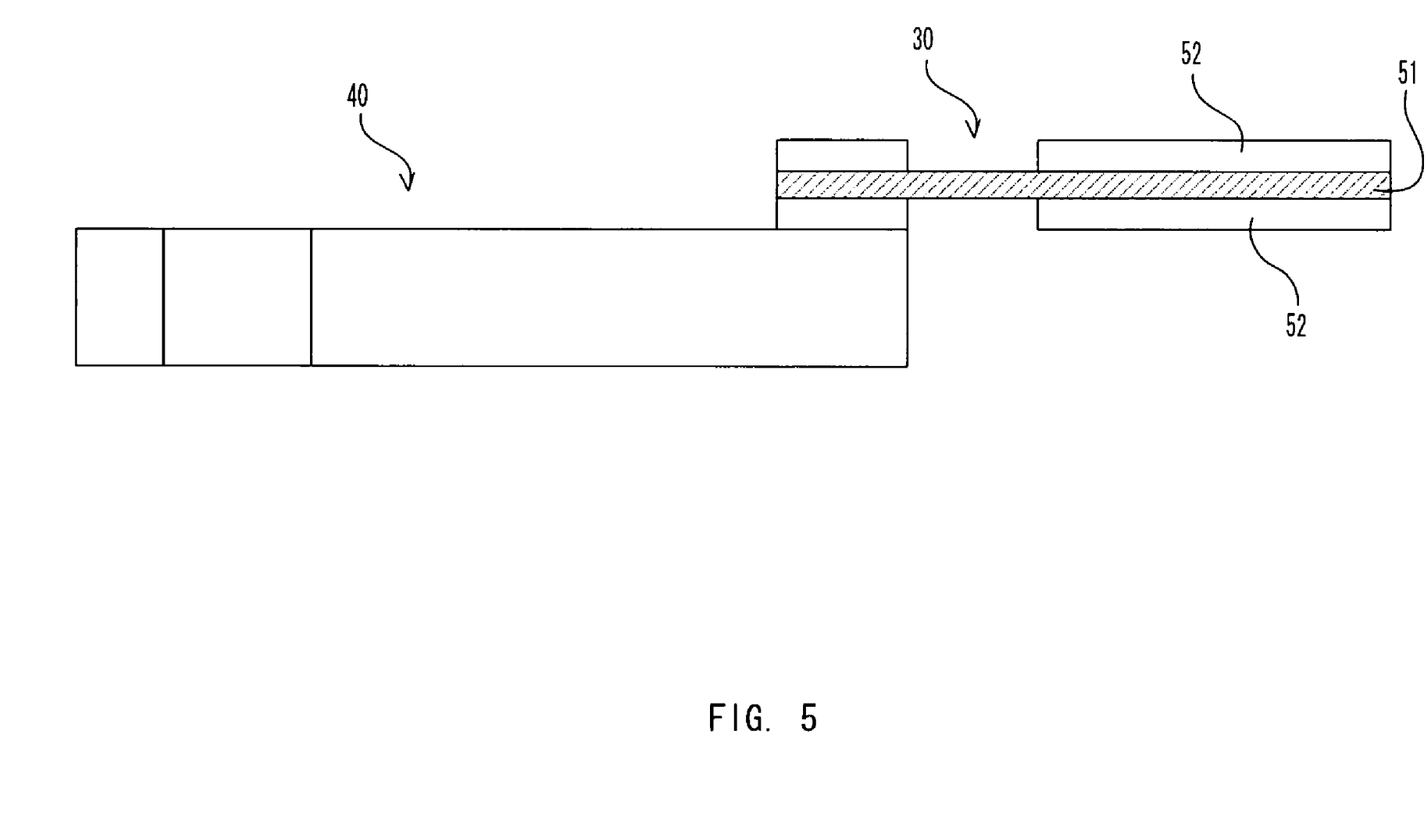
FIG. 5 is a schematic side view of the magnetic head suspension illustrated in FIG. 4 with a flexure forming member for forming a flexure detached.

FIG. 5 illustrates a schematic side view of the state where a flexure forming member 10*a* forming the flexure 10 is detached.

As illustrated in FIG. 5, the laminated member 50 has a flexible member 51 extending in a longitudinal direction and low-specific-gravity members 52 laminated on the flexible member 51 so as to be positioned at least on a side in contact with the base portion 40. In a region in which the load-bent portion 30 is formed, only the flexible member 51 exists.

In this embodiment, the low-specific-gravity members 52 are laminated on upper and lower opposite faces of the flexible member 51 in such a manner as to sandwich the member 51 as illustrated in FIG. 5.

The flexible member 51 is made of a material with sufficient flexibility to perform a function as the blade spring which is required of the load-bent portion 30.

The flexible member 51 is made of stainless steel, a titanium alloy, a copper alloy or the like. The flexible member 51 has a thickness of 30 to 60 μm, for example.

The low-specific-gravity member 52 is made of a material which can be welded to the base portion 40 and which has a specific gravity lower than that of the flexible member 51.

The low-specific-gravity member 52 has sufficient rigidity to function as the load beam 20 in a region in which the low-specific-gravity member 52 is joined to the flexible member 51.

It is preferable that the low-specific-gravity member 52 is made of aluminum, an aluminum alloy or the like. The low-specific-gravity member 52 has a thickness of 20 to 50 μm, for example.

Herein, an example of a method of producing the magnetic head suspension 2 according to this embodiment will be described.

Figure 6:
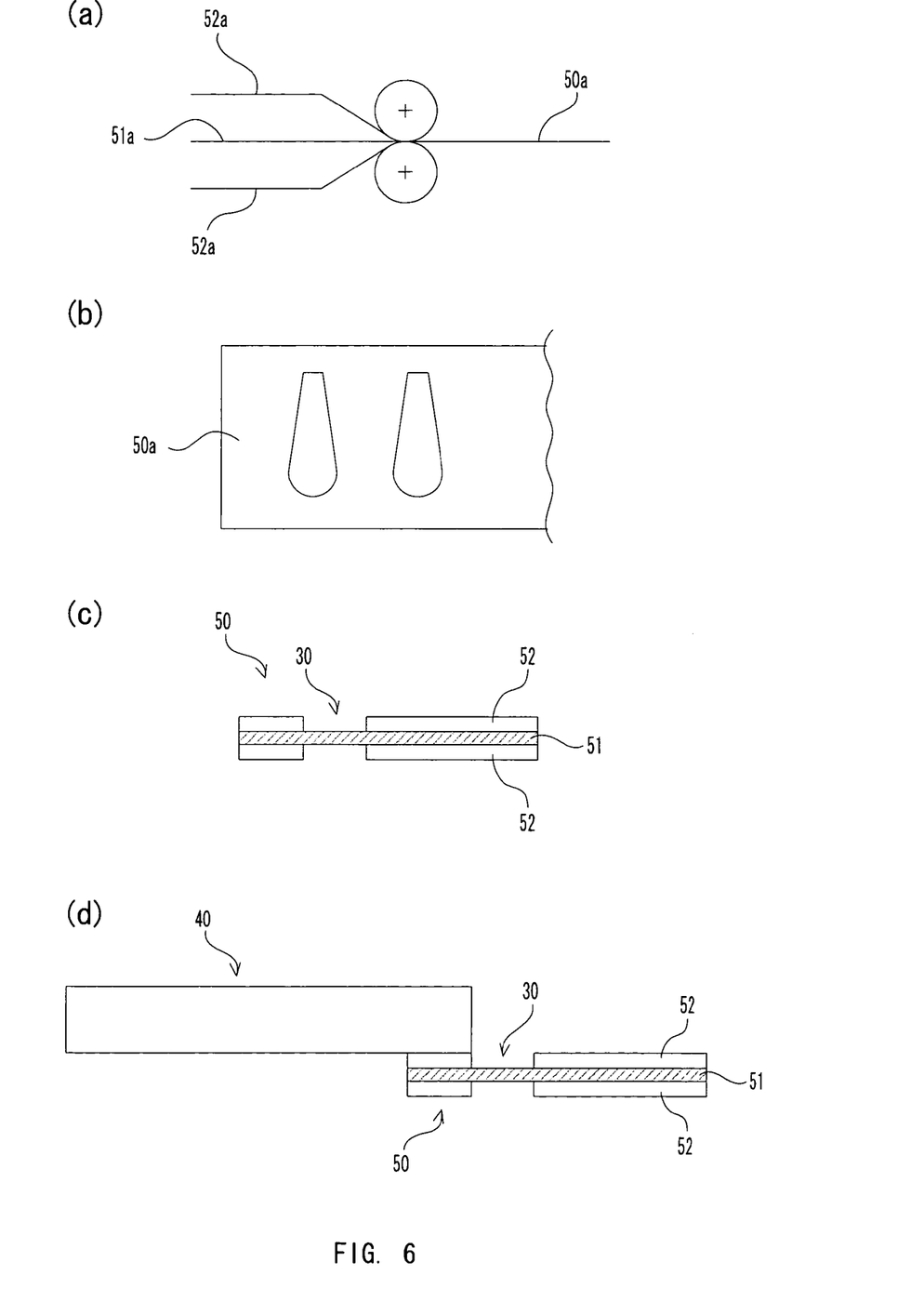

FIGS. 6(*a*) to 6(*d*) illustrate flow diagrams of the producing method.

As illustrated in FIG. 6(*a*), a flexible member forming plate 51*a* and low-specific-gravity member forming plates 52*a* are joined to each other by rolling to form a laminated clad 50*a*.

For example, the flexible member forming plate 51*a* has a thickness of 30 to 60 μm and each of the low-specific-gravity member forming plates 52*a* has a thickness of 20 to 50 μm.

Then, the laminated clad 50*a* is shaped into a predetermined shape (FIG. 6(*b*)), only regions of the low-specific-gravity members 52 corresponding to the load-bent portion 30 are partially etched out to form the laminated member 50 (FIG. 6(*c*)).

At this time, since the flexible member 51 and the low-specific-gravity member 52 are made of different kinds of materials as described above, the flexible member 51 can be utilized as an etching stopper layer and it is possible to effectively remove only the low-specific-gravity members 52 by etching.

Such etching can be carried out by using a material selective etchant, for example.

Then, the low-specific-gravity member 52 and the base portion 40 are welded to each other to thereby join the laminated member 50 and the base portion 40 to each other (FIG. 6(*d*)).

Such welding can be carried out by laser welding, ultrasonic welding and resistance welding, for example.

In the magnetic head suspension 2 with this structure, while the same material as that of the low-specific-gravity member 52 is used to form the base portion 40, the base portion 40 and the laminated member 50 can be joined to each other by welding.

Therefore, it is possible to reduce the mass of the whole magnetic head suspension without reducing the rigidity.

This specification is by no means intended to restrict the present invention to the preferred embodiments set forth therein. Various modifications to the magnetic head suspension, as described herein, may be made by those skilled in the art without departing from the spirit and scope of the present invention as defined in the appended claims.

What is claimed is:

1. A magnetic head suspension comprising:
    a flexure for supporting a magnetic head;
    a load-bent portion for generating a load for pressing said magnetic head to a magnetic disk;
    a load beam for transmitting the load generated by said load-bent portion to said flexure; and
    a base portion connected to said load-bent portion, in which
    said base portion has a main body and an embedded body embedded in the main body so as to be positioned in a region in which the main body and said load-bent portion overlap with each other,
    said main body is made of a material having a specific gravity lower than that of said embedded body,
    said embedded body is made of a material which can be welded to said load-bent portion, and
    said load-bent portion and said embedded body are welded to each other to thereby join the load-bent portion and said base portion to each other.

2. A magnetic head suspension as set forth in claim 1, in which
    said main body is made of any one of aluminum, an aluminum alloy, magnesium and a magnesium alloy, and said embedded body is made of any one of nickel, a nickel alloy, stainless steel, a stainless alloy, titanium and a titanium alloy.

3. A magnetic head suspension as set forth in claim 1, in which
said embedded body is made of the same material as that of said load-bent portion.

4. A magnetic head suspension as set forth in claim 2, in which
said embedded body is made of the same material as that of said load-bent portion.

5. A magnetic head suspension as set forth in claim 1, in which
said base portion is an arm capable of being attached to a bearing of a voice coil motor.

6. A magnetic head suspension as set forth in claim 1, in which
said base portion can be attached to an E block by caulking.

7. A magnetic head suspension comprising:
a flexure for supporting a magnetic head;
a load-bent portion for generating a load for pressing said magnetic head to a magnetic disk;
a load beam for transmitting the load generated by said load-bent portion to said flexure; and
a base portion connected to said load-bent portion, in which
a laminated member forming said load-bent portion and said load beam is provided, and
said laminated member has a flexible member extending in a longitudinal direction and a low-specific-gravity member which is laminated on said flexible member so as to be positioned at least on a side in contact with said base portion and which is made of a material capable of being welded to said base portion and having a specific gravity lower than that of said flexible member, only said flexible member existing in a region of the laminated member in which said load-bent portion is to be formed.

8. A magnetic head suspension as set forth in claim 7, in which
said laminated member is formed by laminating said low-specific-gravity members on both sides of said flexible member in such a manner as to sandwich said flexible member.

9. A magnetic head suspension as set forth in claim 7, in which
said base portion is made of the same material as that of said low-specific-gravity member.

10. A magnetic head suspension as set forth in claim 8, in which
said base portion is made of the same material as that of said low-specific-gravity member.

11. A magnetic head suspension as set forth in claim 7, in which
said laminated member is formed by laminating said flexible member and said low-specific-gravity member by pressing, and
said low-specific-gravity member is removed by etching only in a region of the laminated member in which said load-bent portion is to be formed.

12. A magnetic head suspension as set forth in claim 8, in which
said laminated member is formed by laminating said flexible member and said low-specific-gravity member by pressing, and
said low-specific-gravity member is removed by etching only in a region of the laminated member in which said load-bent portion is to be formed.

13. A magnetic head suspension as set forth in claim 9, in which
said laminated member is formed by laminating said flexible member and said low-specific-gravity member by pressing, and
said low-specific-gravity member is removed by etching only in a region of the laminated member in which said load-bent portion is to be formed.

14. A magnetic head suspension as set forth in claim 10, in which
said laminated member is formed by laminating said flexible member and said low-specific-gravity member by pressing, and
said low-specific-gravity member is removed by etching only in a region of the laminated member in which said load-bent portion is to be formed.

15. A magnetic head suspension as set forth in claim 7, in which
said flexible member is made of any one of stainless, a titanium alloy or a copper alloy, and
said low-specific-gravity member is made of any one of aluminum or an aluminum alloy.

* * * * *